(12) United States Patent
Goldfeder et al.

(10) Patent No.: US 9,363,542 B2
(45) Date of Patent: *Jun. 7, 2016

(54) TECHNIQUES TO PROVIDE AN ENHANCED VIDEO REPLAY

(71) Applicant: CBS Interactive Inc., San Francisco, CA (US)

(72) Inventors: Bruce Goldfeder, Freeport, NY (US); Ken Aagaard, Closter, NJ (US)

(73) Assignee: CBS INTERACTIVE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,198

(22) Filed: Nov. 24, 2014

(65) Prior Publication Data

US 2015/0082343 A1    Mar. 19, 2015

Related U.S. Application Data

(63) Continuation of application No. 13/948,782, filed on Jul. 23, 2013, now Pat. No. 8,925,004, which is a continuation of application No. 13/556,745, filed on Jul. 24, 2012, now Pat. No. 8,495,697.

(51) Int. Cl.
| | |
|---|---|
| *H04N 7/10* | (2006.01) |
| *H04N 7/025* | (2006.01) |
| *H04N 5/222* | (2006.01) |
| *H04N 7/173* | (2011.01) |
| *H04N 21/2343* | (2011.01) |
| *H04N 21/234* | (2011.01) |
| *H04N 21/2387* | (2011.01) |
| *H04N 21/6587* | (2011.01) |
| *H04N 21/8541* | (2011.01) |
| *H04N 5/91* | (2006.01) |
| *G11B 27/031* | (2006.01) |

(52) U.S. Cl.
CPC ........ *H04N 21/23439* (2013.01); *G11B 27/031* (2013.01); *H04N 5/91* (2013.01); *H04N 21/2387* (2013.01); *H04N 21/23424* (2013.01); *H04N 21/6587* (2013.01); *H04N 21/8541* (2013.01)

(58) Field of Classification Search
None
See application file for complete search history.

(56) References Cited

U.S. PATENT DOCUMENTS

| 5,742,892 A | * | 4/1998 | Chaddha | ................. G06T 9/008 375/240.11 |
| 2003/0210329 A1 | * | 11/2003 | Aagaard | ................. H04N 7/181 348/159 |

FOREIGN PATENT DOCUMENTS

KR    WO 2009104850 A1 *  8/2009    ......... H04N 21/2365

* cited by examiner

*Primary Examiner* — Nathan Flynn
*Assistant Examiner* — William J Kim (57) ABSTRACT

Techniques to provide an enhanced video replay are described. A processor component controls a video interface module, a replay clip editing module, a replay clip selection module, and a broadcast feed module. The video interface module may receive a first and a second video stream of an event in a first and a second video resolution. The replay clip editing module may determine a time period within the second video stream that contains a scene of interest and create multiple video clips in the first video resolution. The multiple video clips each represent of a portion of the field of view of the second video stream. The broadcast feed module may interrupt a broadcast feed of the first video stream and insert the selected one of the multiple video clips into the broadcast feed. Other embodiments are described and claimed.

19 Claims, 9 Drawing Sheets

TECHNIQUES TO PROVIDE AN ENHANCED VIDEO REPLAY

CROSS-REFERENCE OF RELATED APPLICATIONS

This application is a continuation of, claims the benefit of and priority to, previously filed U.S. patent application Ser. No. 13/948,782 entitled "TECHNIQUES TO PROVIDE AN ENHANCED VIDEO REPLAY" filed on Jul. 23, 2013, which is a continuation of, claims the benefit of and priority to, previously filed U.S. patent application Ser. No. 13/556,745 entitled "TECHNIQUES TO PROVIDE AN ENHANCED VIDEO REPLAY" filed on Jul. 24, 2012, both of which are hereby incorporated by reference in their entirety.

BACKGROUND

Instant replay for televised sporting events allows the broadcaster to present plays of interest to viewers multiple times. Instant replay is often used to replay significant events during a game in which there may be some question as to the outcome of the play. For instance, instant replay in conjunction with slow motion may be used to determine whether a receiver in a football game had possession of the football while maintaining both feet in bounds or whether a player was down on the ground prior to losing possession of the football. In another example, instant replay may be helpful in determining whether a batted baseball is fair or foul at a given moment. In both examples, the scene of interest within a video stream may only cover a small portion of a display screen. Even in high definition (HD) resolution over an HD-SDI interface, it can be difficult to accurately determine whether a player's knee is down at the moment possession of the ball is lost.

HD-SDI stands for High-Definition Serial Digital Interface. HD-SDI is the common term for a high-definition digital video transmission standard that is part of a family of Serial Digital Interface standards that use a coaxial cable to transport uncompressed digital video. HD-SDI is defined by the Society of Motion Picture and Television Engineers (SMPTE) in a standard known as SMPTE-292M that provides a nominal data rate of 1.485 Gbit/s. In short, HD-SDI is a standard for transmitting uncompressed broadcast-grade video streams over short distances. Longer distances may be possible using fiber optic cables.

Zooming in on the scene of interest does not always help as the zooming process significantly degrades the picture quality. This is because the resolution of the zoomed portion of a frame of video is often less than the non-zoomed original resolution of the frame of video. Thus, a zoomed image appears more pixelated or blurred than a normal image. For instance, enlarging a portion of a video frame by a zoom factor of two (2) will cut the resolution of the zoomed portion of the video frame in half.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to provide an enhanced video replay. Some embodiments are particularly directed to techniques to provide an enhanced video replay for live sporting events. In one embodiment, for example, an apparatus may comprise a processor component that controls a video interface module, a replay clip editing module, a replay clip selection module, and a broadcast feed module. The video interface module may receive a first and a second video stream of an event in a first and a second video resolution. The second video resolution may be higher than the first video resolution. The replay clip editing module may determine a time period within the second video stream that contains a scene of interest. The replay clip editing module may also create multiple video clips in the first video resolution. The multiple video clips may be derived from the second video stream during the time period that contains the scene of interest. Each video clip may represent a portion of the field of view of the second video stream zoomed to fill the entire screen in the first video resolution. The replay clip selection module may select one of the multiple video clips. The broadcast feed module may interrupt a broadcast feed of the first video stream and insert the selected one of the multiple video clips into the broadcast feed in a seamless manner. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

As described above, even in high definition (HD) resolution it can be difficult to accurately determine what may be happening in the video stream if the scene of interest is relegated to a small portion of the overall screen. Zooming in on the scene of interest does not always help as the zooming process typically results in the zoomed image appearing more pixelated or blurred than the non-zoomed image. However, it may be possible to capture a second video stream from substantially the same vantage point or perspective in which the resolution of the second video stream is substantially higher than the first video stream.

In one embodiment, the second video stream may be captured in an ultra high definition (UHD) resolution. UHD television (UHD-TV) is a digital video format proposed by NHK Science & Technology Research Laboratories. UHDTV can have a resolution as much as 16 times the number of pixels of the 1080p HD television standard. UHD-TV may currently be defined as having two levels called UHD-TV1 (3840×2160 or 4K) which is just over 8 megapixels per frame and UHD-TV2 (7680×4320 or 8K) which is over 32 megapixels per frame. Notwithstanding the 2K HD, 4K UHD and 8K UHD industry nomenclature, the ratio of the UHD to HD resolutions given above are 4:1 and 8:1, meaning the second UHD 4K video stream has a resolution that is four times greater than the first HD 2K video stream.

Current cost and bandwidth constraints may make it impractical to broadcast the higher resolution second (e.g., UHD) video stream of an event, such as a live sporting event, for example. In addition, there are not a substantial number of UHD television receivers in use to receive such a television signal to warrant the expense of broadcasting in UHD format. Nevertheless, the higher resolution second video stream may still be put to good use.

In general, a first video stream may comprise an HD video stream having a resolution of approximately 2.0 megapixels per video frame. Such an HD resolution may also be referred to as 1080p. 1080p HD actually refers to a resolution of (1920×1080) which is just over 2 megapixels per frame of video. In industry nomenclature, this HD format may be referred to as 2K.

It should be noted that there may be other HD resolutions but the 1080p HD or 2K resolution is the highest for HD. Similarly, there can be other UHD resolutions. Currently, the 2160p UHD or 4K resolution is generally the minimum UHD resolution known in the industry. Throughout this description the term 2K may be used to refer to the 1080p HD resolution of 2 megapixels per frame of video and the term 4K may be used to refer to the 2160p UHD resolution of 8 megapixels per frame of video. It may be appreciated that other video standards may be used with other levels of resolution as desired for a given implementation. The embodiments are not limited in this context.

While the second higher resolution video stream may not be broadcast for practical reasons, it may be edited on the fly to create useful video clips of zoomed scenes of interest that may be inserted into a broadcast of the first video stream to enhance the viewing experience of a viewer. The techniques for generating and utilizing the second video stream are described in greater detail below.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Figure 1:
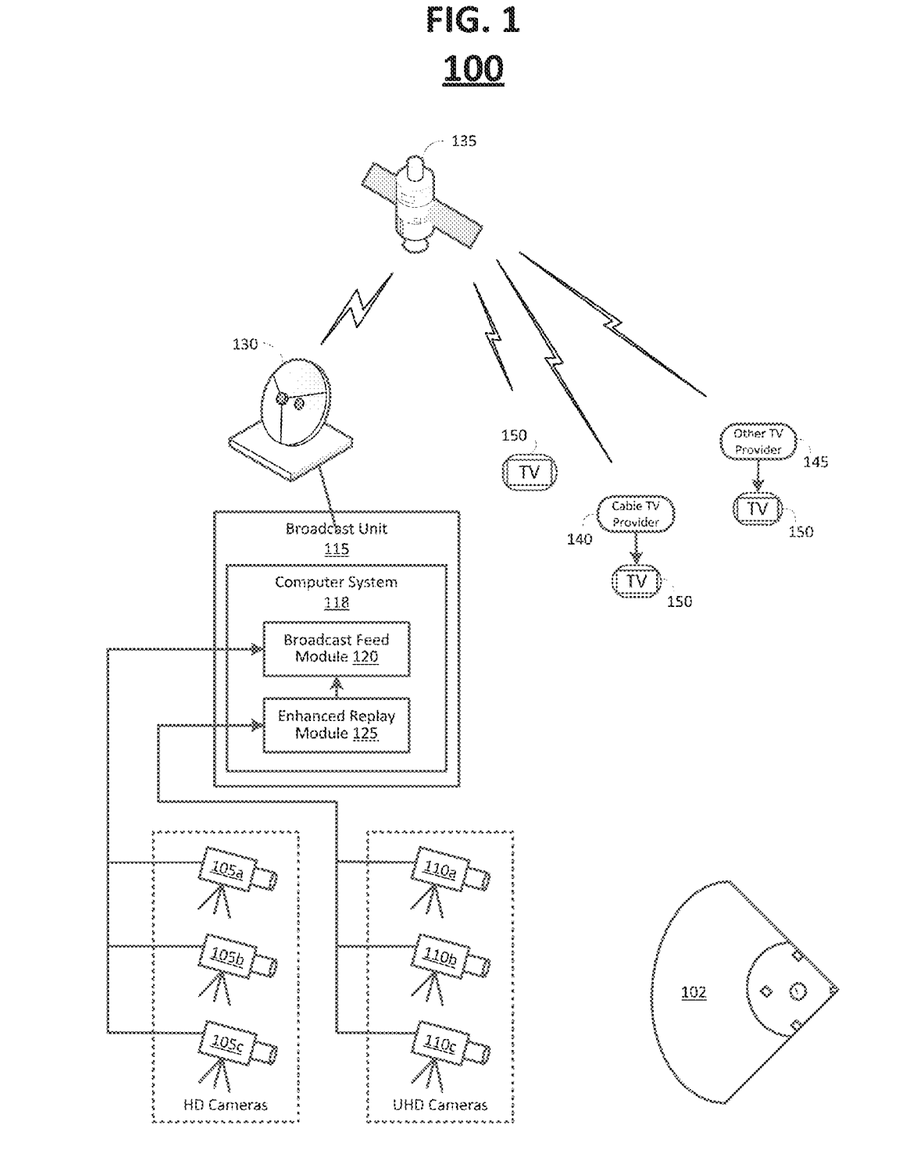
FIG. 1 illustrates an embodiment of a system to capture and replay a portion of a video stream.

FIG. 1 illustrates a block diagram for a system 100 to capture and replay a portion of a video stream. In one embodiment, the system 100 may comprise a computer-implemented system having at least one software application termed an enhanced replay module 125 for convenience. The enhanced replay module 125 may comprise one or more components further described with reference to FIG. 2. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=3, then a complete set of components 122-a may include components 122-1, 122-2, and 122-3. The embodiments are not limited in this context.

FIG. 1 is generally an illustration of a broadcast event, such as a sporting event that, is being broadcast to a television viewing audience. In this example, the sporting event is a baseball game as depicted by a baseball field 102, although any broadcast event may be used as well. Multiple video camera units capable of capturing varying resolution levels of video information may be used to simultaneously record video (and audio) information of the baseball game. A given type of camera and associated resolution level may vary according to a particular implementation. It may be appreciated that the examples given below are provided as one possible implementation, and others may be used as well. The embodiments are not limited in this context.

As shown in FIG. 1, multiple HD camera units 105a-c may capture a first video stream of the event in a first resolution from multiple perspectives. The first resolution may be, for example, a 1080p or 2K HD format that includes 2 megapixels per frame of video. The raw video data for the first video stream may be forwarded to a computer system 118 within a broadcast unit 115 to be processed before being broadcast via a broadcast satellite uplink component 130.

The broadcast satellite uplink component 130 may relay the HD broadcast signal representative of the first video stream to a satellite 135 equipped to receive and re-transmit the HD broadcast signal. The re-transmitted HD broadcast signal from satellite 135 may be received by a variety of media systems, such as television systems. For example, the re-transmitted HD broadcast signal from satellite 135 may be received by a cable television provider 140. The cable television provider 140 may, in turn, distribute the HD broadcast signal to its subscribers such that it may be rendered on a subscriber's television 150. In another example, the re-transmitted HD broadcast signal from satellite 135 may be received by another television provider 145 such as, for instance, a provider that distributes television via enhanced telephone lines. The other television provider 145 may, in turn, distribute the HD broadcast signal to its subscribers such that it may be rendered on a subscriber's television 150. The re-transmitted HD broadcast signal from satellite 135 may be received directly at a viewer's television 150 if the viewer subscribes to a satellite television service provider. In another example, a viewer may receive the HD broadcast signal from a local television station. In this example, the re-transmitted HD broadcast signal from satellite 135 may be received by a local television station and re-transmitted over-the-air to a more limited geographic area such that a television 150 equipped with an antenna may receive the HD broadcast signal. The embodiments are not limited to these examples.

The system 100 may also comprise multiple UHD camera units 110a-c capable of capturing a second video stream of the event in a second resolution from multiple perspectives. The second resolution may be, for example, a 4K UHD format that includes 8 megapixels per frame of video. The raw video data for the second video stream may also be forwarded to a broadcast unit 115 to be stored and processed when needed.

The computer system 118 may broadly comprise a broadcast feed module 120 adapted to receive and broadcast a first video stream and an enhanced replay module 125 adapted to receive and process a second video stream into usable video clips in the resolution of the first video stream. The term broadcast unit 115 is a term of convenience used to refer to a location that houses computer system 118 or other equipment used to receive, process, edit and relay the captured video stream(s) to the broadcast satellite uplink component 130. Thus, any facility that can house a computer system 118 and receive, process, edit and relay the captured video stream(s) to the broadcast satellite uplink component 130 may be considered a broadcast unit 115 for purposes of this description. The embodiments are not limited to this example.

The broadcast feed module 120 may be generally arranged to perform tasks associated with receiving raw video stream data and processing the raw video stream data into a format suitable to be broadcast to an end viewer's television set. Examples of a broadcast feed module 120 may include without limitation a special purpose computer system or a general purpose computer system that may include specific hardware and software for receiving and processing raw video stream data. In one embodiment for example, a broadcast feed module 120 may be implemented as one or more processor components that execute a video compression algorithm to compress the raw video stream data into a bit stream that is compatible with broadcasting standards. The embodiments, however, are not limited to this example.

The enhanced replay module 125 may be generally arranged to perform tasks associated with creating video clips from a second video stream that are compatible with a broadcast feed of a first video stream. Examples of an enhanced replay module 125 may include without limitation a special purpose computer system or a general purpose computer system that may include specific hardware and software for receiving and processing raw video stream data from a second video stream. In one embodiment for example, an enhanced replay module 125 may be implemented as one or more processor components that control and execute software applications that can create multiple video clips from a second stream of video that are compatible with a first stream of video when the resolution of the first and second streams of video are different. The embodiments, however, are not limited to this example.

Figure 2:
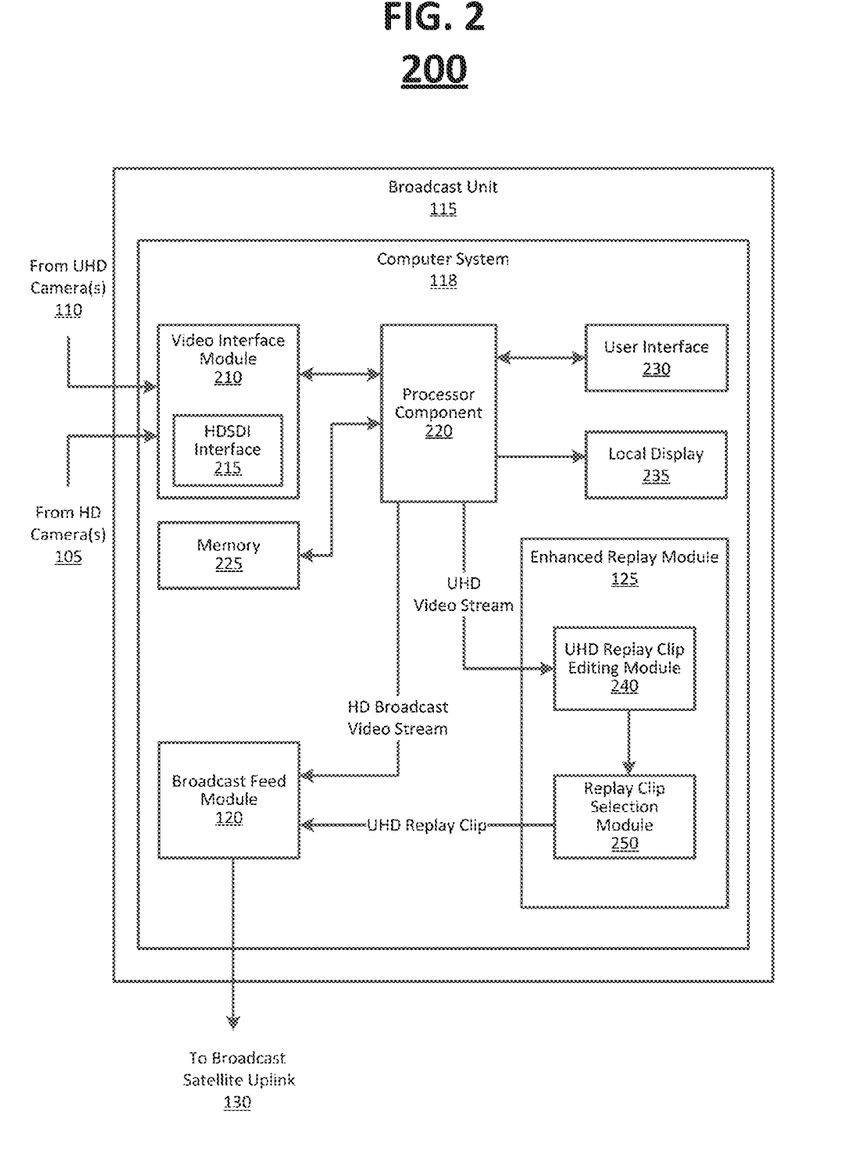
FIG. 2 illustrates an embodiment of a first component for an application.

FIG. 2 illustrates an embodiment of an operational environment 200 for the system 100. As shown in FIG. 2, the first video stream from HD camera units 105a-c may be received by a video interface module 210 over an HD-SDI interface 215 within computer system 118. The video interface module 210 may also receive a second video stream in UHD format from UHD camera units 110a-c.

During a typical broadcast, the first video stream is captured as raw video data by the HD camera units 105a-c and relayed to the video interface module 210 that is under control of a processor component 220 within the computer system 118. The processor component 220 may relay the raw video data of the first video stream to the broadcast feed module 120 where it may be processed before being relayed to the broadcast satellite uplink component 130. Typical processing that may occur to the first video stream may include compressing the raw video data of the first video stream received from the camera units 105a-c into a format suitable to broadcast. The result may be a compressed HD broadcast signal. The compressed HD broadcast signal may be decompressed on the user end before rendering on a television 150. Other processing may include overlaying text or graphics, use of a telestrator to create visible marks on the first video stream, and other special effects. The embodiments are not limited to these examples.

As often happens during live sporting events, a play may occur in which the outcome is not abundantly clear. In such instances, the broadcaster may opt to replay a video clip of the play to see if the outcome can be determined upon a second look. This is commonly referred to as instant replay. Sometimes the instant replay may be supplemented by slow motion in which the frame rate is reduced so that each individual frame of the video stream is viewable for a longer period of time. However, instant replay and slow motion may not always help resolve the question as to the outcome of the play. One other tool at the broadcaster's disposal may be the ability to zoom in on a portion of the play to enlarge the image at the scene of interest. As previously noted, however, zooming will degrade the video quality of the image(s) by lowering the resolution. For instance, zooming by a factor of four will reduce the resolution of the image zoomed by a corresponding factor of four. This degradation of video image quality may negate the advantages of zooming entirely.

The second video stream as captured by the UHD camera units 110a-c and relayed to the video interface module 210 may be of significantly greater resolution than the first video stream such that it can be zoomed and enlarged and still maintain a resolution that is at or above HD 2K resolution. Thus, it may be possible to utilize portions of the second video stream to enhance the video replay capabilities of the first video stream for the broadcast event.

The second video stream in UHD format may be received from UHD camera units 110a-c may be locally stored in a memory 225 under control of the processor component 220. The computer system 118 may further comprise a user interface 230 and a local display 235. An operator may access and execute the enhanced replay module 125 of computer system 118 through the user interface 230 and display 235. For example, the user interface 230 may include interfaces to standard input devices including a mouse, keyboard, trackball, touchscreen surface, etc. The local display 235 may provide a visual presentation of the screen interface(s) of the enhanced replay module 125 and broadcast feed module 120. The embodiments are not limited to these examples.

The enhanced replay module 125 may be comprised of a UHD replay clip editing module 240 and a replay clip selection module 250. The UHD replay clip editing module 240 may be adapted to receive and process a portion of the second video stream. The processing of the second video stream may include determining a time point to start a clip and a time point to end a clip. The portion of the second video stream between the start and end time points may include one or more frames of video that capture a play of interest for the event. Once the second video stream has been demarcated by start and end points, the second video stream between the start and end points may be divided into multiple windows such that each window covers a portion of a full screen. For example, if the second video stream were a 4K UHD video stream, it would have a resolution of 8 megapixels per frame of video. This is 4 times greater than the 2K HD resolution of 2 megapixels per frame of video for the first video stream. Thus, the second video stream can be divided into four quadrants each of which exhibits 2K HD resolution when enlarged to fit an entire television screen. The UHD replay clip editing module 240 may then store a 2K HD representation for each window of the second video stream clip in memory 225.

The replay clip selection module 250 may present an index of the stored video clip for each window of the second video stream via the local display 235. An operator may review the various clips to determine which one best illustrates the scene of interest for the play that just occurred in the event. The operator may further determine whether other video clips include portions of the scene of interest that may be worth replaying. Once a video clip is selected, it may be forwarded to the broadcast feed module 120 where the operator may substitute it into the broadcast feed of the event.

To ensure a seamless transition from the feed of the first video stream to the clip of the second video stream, the clip may be edited such that the entire undivided clip of the second video stream begins playing at the previously marked start time. The undivided second stream video clip will be played at the resolution of the first video stream to ensure compatibility in the broadcast of the first video stream. At some point after the start time but before the scene of interest appears in the second video stream, the operator may switch to one of the windows that represents only a portion of the second video stream. The window that includes the best perspective of the scene of interest may be selected. Upon transitioning to the video clip of the window from the second video stream, the window may be enlarged to fill the full screen. It should be noted that the broadcast feed module 120 may similarly compress the video clip of the window from the second video stream before relaying to the broadcast satellite uplink component 130. This may ensure that the broadcast signal is consistent regardless of its source (e.g., first video stream or second video stream).

Because the resolution of the second video stream is larger than the resolution of the first video stream, the enlargement of the window does not degrade the video resolution quality of the video perceived by the viewer. For example, if the first video stream resolution is 2K HD and the second video resolution is 4K UHD, each quadrant of the second video stream will have a resolution of 2K HD. Thus, enlarging the window (e.g., quadrant in this example) to fill the full screen will allow for a four (4) times zoom factor with no loss of resolution.

This represents a significant improvement over zooming the first video stream by a factor of four that would cause a corresponding image quality resolution degradation by the same factor of four. In addition, an operator may opt to replay the video clip window in slow motion to further aid the viewer in determining the outcome of the play as depicted in the scene of interest. Once the scene of interest has played out, the video clip may transition back to the undivided full screen representation of the entire second video stream albeit in the resolution of the first video stream until the video clip terminates at the marked end point. The broadcast feed module may then transition back to the feed of the first video stream. If other video clip windows of the second video stream contain portions of the scene of interest, the process may be repeated to show such windows.

Thus, FIG. 2 illustrates an apparatus that may be characterized as a computer system 118 under control of a processor component 220. The video interface module 210 may be operative by the processor component 220 to receive a first video stream of an event in a first video resolution and a second video stream of the event in a second video resolution. The second video resolution may be higher than the first video resolution. The UHD replay clip editing module 240 may be operative by the processor component 220 to determine a time period within the second video stream that contains a scene of interest of the event. The UHD replay clip editing module 240 may create multiple video clips in the first video resolution in which the multiple video clips may be derived from the second video stream within the determined time period. Each of the multiple video clips may be representative of a portion of the field of view of the second video stream. The replay clip selection module 250 may be operative by the processor component 220 to select one of the multiple video clips. The broadcast feed module 120 may be operative by the processor component 220 to interrupt a broadcast feed of the first video stream and insert the selected video clip into the broadcast feed.

The UHD replay clip editing module 240 may be operative by the processor component 220 to determine whether any other of the multiple video clips illustrate the scene of interest. The replay clip selection module 250 operative by the processor component 220 may select any other of the multiple video clips that illustrate the scene of interest to be played back. The broadcast feed module 120 operative by the processor component 220 may also cause replay of a selected video clip in slow motion.

In one embodiment, the second video resolution of the second video stream may be at least four (4) times the first video resolution of the first video stream. Such a resolution may allow the second video stream to be divided into four windows or quadrants without degrading the resolution of any quadrant below the first video resolution of the first video stream. For example, the first video resolution may be a 2K HD resolution of 2 megapixels per frame of video and the second video resolution may be a 4 k UHD resolution of 8 megapixels per frame of video. The embodiments are not limited to these examples.

Figure 3:
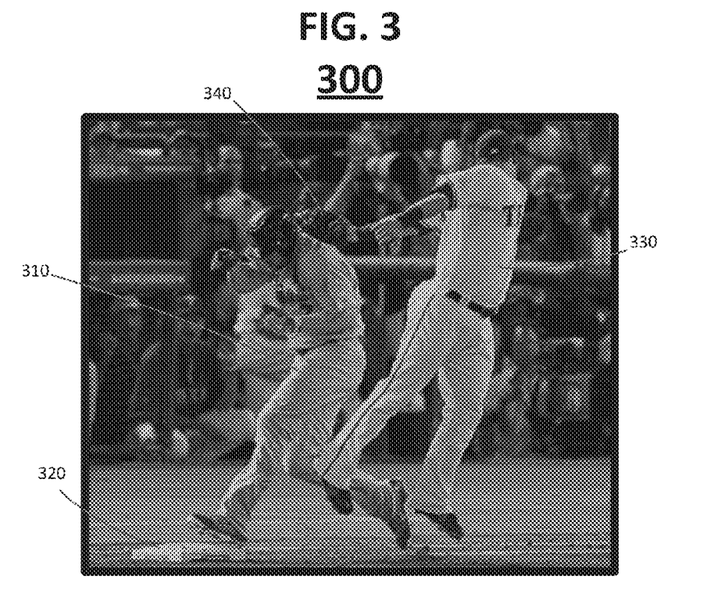
FIG. 3 illustrates an example of a frame of video from a baseball game in a second video resolution.

FIG. 3 illustrates an example of a frame of video 300 from a baseball game in a second video resolution. This example illustrates a play in a baseball game. As shown, a runner 310 is approaching a base 320 while a fielder 330 attempts to tag the runner 310 with his glove 340 before the runner 310 touches the base 320. All of this occurs during real-time meaning the second video stream changes frames at a rate of 30 frames per second (fps), for example. At such speeds, it may be difficult to see whether the glove 340 actually makes contact with the runner 310 at any point. The UHD replay clip editing module 240 may be used to process the second video stream to help determine the outcome of this play.

Figure 4:
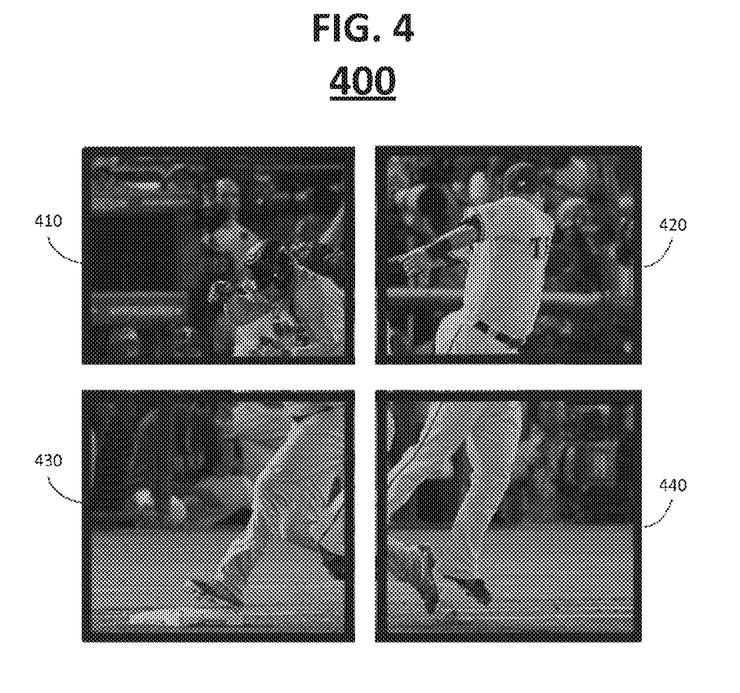
FIG. 4 illustrates an example the frame of video from a baseball game in a second video resolution from FIG. 3 divided into multiple windows.

FIG. 4 illustrates an example the frame of video from a baseball game in a second video resolution from FIG. 3 divided into multiple windows 410, 420, 430 and 440. The UHD replay clip editing module 240 may divide the second video stream into the aforementioned four windows 410, 420, 430 and 440. Each of these windows may have a resolution that is ¼ the overall resolution. However, ¼ the overall resolution of the second video stream may still be equivalent to the resolution of the first video stream. Thus, each quadrant or window 410, 420, 430 and 440 possesses a resolution equal to the resolution that is being viewed by the end viewer. The replay clip selection module 250 may assist in selecting one of the multiple windows 410, 420, 430 and 440 to play back.

Figure 5:
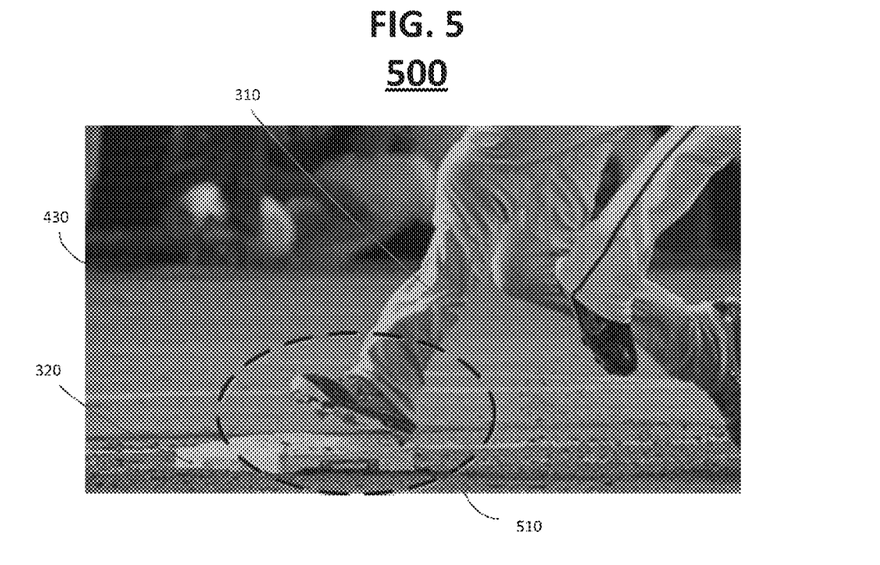
FIG. 5 illustrates an example of a frame of video from a baseball game of one of the multiple windows of FIG. 4.

FIG. 5 illustrates an example of a frame of video from a baseball game of one of the multiple windows 410, 420, 430 and 440 of FIG. 4. In this example, window 430 has been selected by the replay clip selection module 250. Window 430 includes a scene of interest. Specifically, the scene of interest may be characterized as whether the foot of the runner 310 is in contact with the base 320. The window 430 has been enlarged by a zoom factor of four (4) to fill the entire screen at the resolution of the first video stream. Thus, the viewer may see a zoomed portion of the play with no loss of video resolution.

Figure 6:
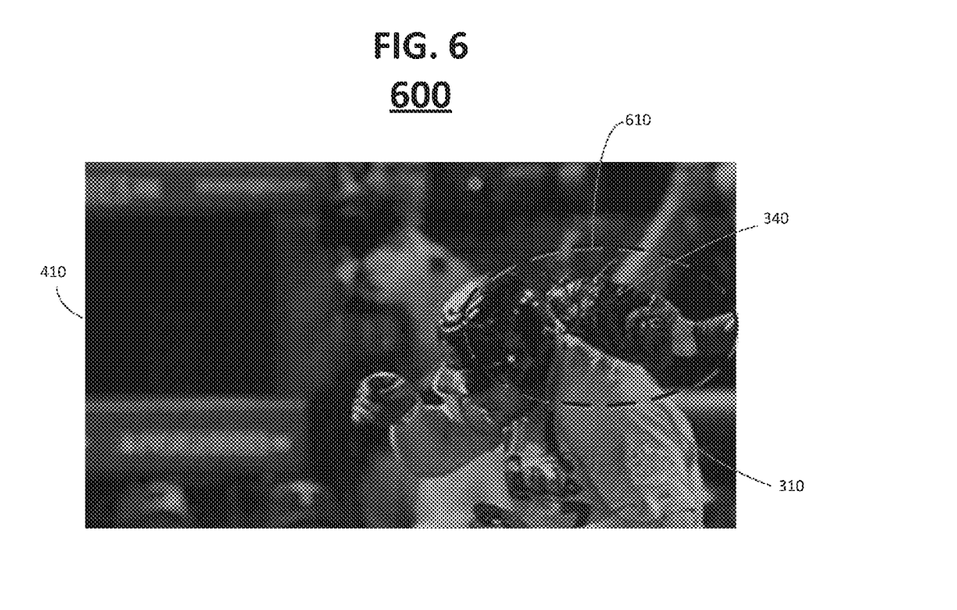
FIG. 6 illustrates another example of a frame of video from a baseball game of another of the multiple windows from FIG. 4.

FIG. 6 illustrates another example of a frame of video from a baseball game of another of the multiple windows 410, 420, 430 and 440 from FIG. 4. In this example, window 410 has been selected by the replay clip selection module 250. Window 410 also includes a scene of interest. Specifically, the scene of interest may be characterized as whether the glove 340 of the fielder 330 is in contact with the runner 310. The window 410 has similarly been enlarged by a zoom factor of four (4) to fill the entire screen at the resolution of the first video stream. Thus, the viewer will see a zoomed portion of the play with no loss of video resolution.

In another embodiment, a portion of the two windows containing the scenes of interest 410 and 430 may be presented side by side on the full screen. One half of each window has a resolution equal to one half the resolution of the first video stream. An operator could clip the second video stream such that each window is cut in half. In the present example, the right half of window 410 would have a resolution of ½ that of the first video stream and similarly, the bottom half of window 430 would have a resolution of ½ that of the first video stream. The two window portions together equal the resolution of the first video stream. In this case, each image may be enlarged to fit half of a full screen without any loss of resolution. The broadcaster may then sync the two window portions in slow motion on a frame by frame basis to show the progression of the action for both scenes of interest. Thus, the viewer can see a zoomed portion of each scene of interest to determine the exact frame in which the glove 340 touches the runner 310. At that point, the viewer can also determine if the runner's foot is in contact with the base 320. The higher resolution second video stream may be processed to show the enhanced replay clip with a zoom factor for each scene of interest at no loss of resolution.

It should be noted that FIGS. 3-6 are illustrative of the embodiments described herein and may not actually depict the resolutions described.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
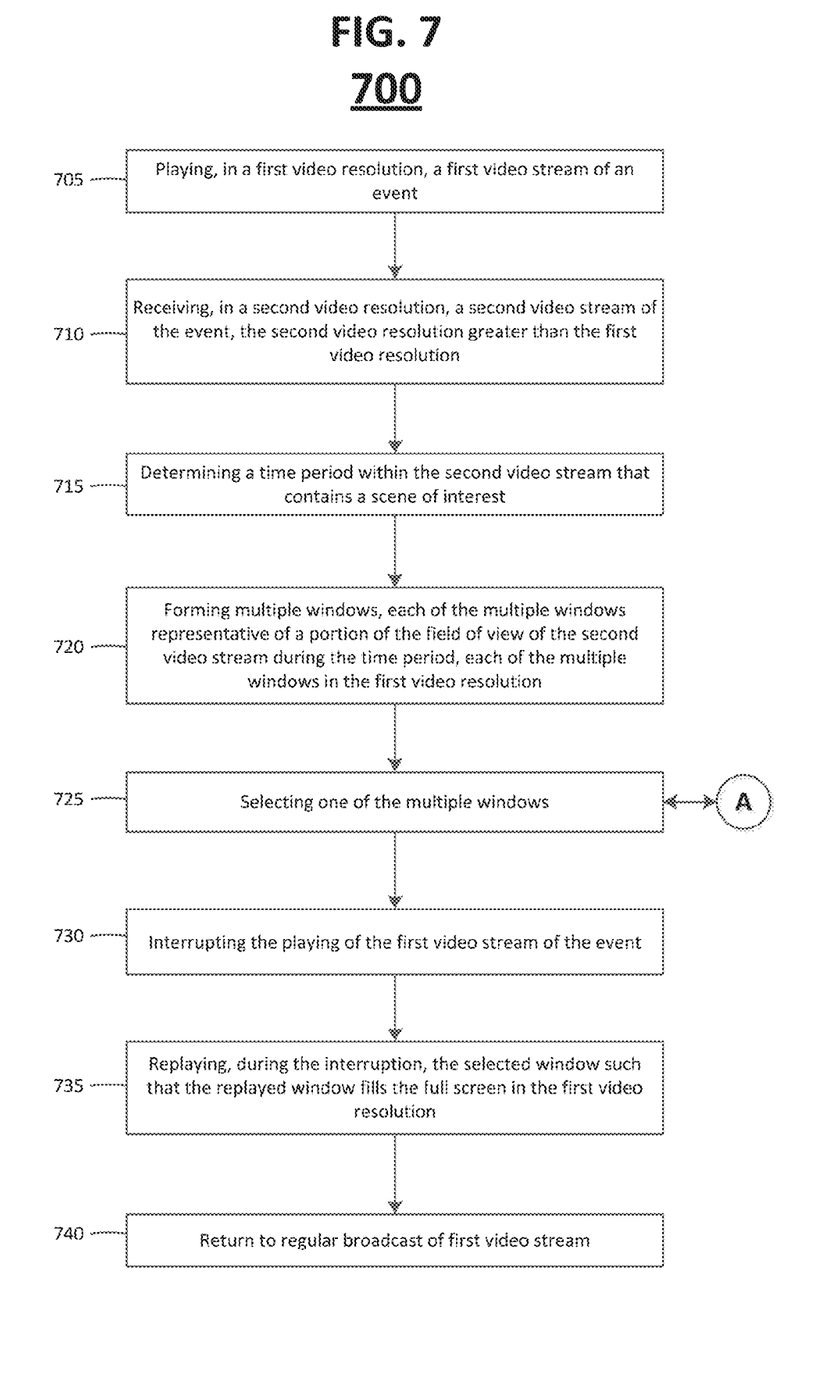
FIG. 7 illustrates one embodiment of a logic flow.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may play, in a first video resolution, a first video stream of an event at block 705. For example, an event may be broadcast normally whereby multiple HD camera units 105a-c capture and forward a first video stream to a computer system 118 via the video interface module 210. The video interface module 210 may relay the first video stream to a broadcast feed module 120 in computer system 118. The broadcast feed module 120 may compress the raw first video stream into a more suitable format for broadcasting before relaying to broadcast satellite uplink component 130. The first video resolution may be a 2K HD resolution of 2 megapixels per video frame. The first video stream may be uncompressed by a set top box or a television on the viewer end. The embodiments are not limited to these examples.

The logic flow 700 may receive, in a second video resolution, a second video stream of the event, the second video resolution greater than the first video resolution at block 710. For example, the event may be simultaneously captured by multiple UHD camera units 110a-c in a second video stream and forwarded to a computer system 118 via the video interface module 210. The second video resolution may be a 4K UHD resolution of 8 megapixels per video frame. The embodiments are not limited to these examples.

The logic flow 700 may determine a time period within the second video stream that contains a scene of interest at block 715. For example, the UHD replay clip editing module 240 may cue up the second video stream for an operator. The operator with the aid of user interface 230 and local display 235 may mark a start point and an end point on the second video stream. The frames of video between the start point and the end point may contain the scene of interest for a play of the event. The embodiments are not limited to these examples.

The logic flow 700 may form multiple windows at block 720 in which each of the multiple windows may be representative of a portion of the field of view of the second video stream during the time period and each of the multiple windows may be in the first video resolution. For example, the UHD replay clip editing module 240 may subdivide the second video stream into separate video streams based on a portion of the screen that the second video stream covers. In one embodiment, the second video stream may be divided into quadrants in which a window may be associated with each quadrant. The embodiments are not limited to these examples.

The logic flow 700 may select one of the multiple windows at block 725. For example, the replay clip selection module 250 may permit an operator to view the individual windows created by the UHD replay clip editing module 240. The replay clip selection module 250 may then permit an operator to select one of the windows based upon a criteria. The selection may be aided by the user interface 230 and the local display 235. The embodiments are not limited to these examples.

The logic flow 700 may interrupt the playing of the first video stream of the event at block 730. For example, the broadcast feed module 120 may receive the selected window from the replay clip selection module 250. Upon receipt, the broadcast feed module 120 may interrupt the first video stream to allow for the replay of the selected window containing a portion of the second video stream that contains the scene of interest. The embodiments are not limited to these examples.

The logic flow 700 may play back, during the interruption, the selected window such that the window fills the full screen using the first video resolution at block 735. For example, the broadcast feed module 120 may insert and play back the selected window containing a portion of the second video stream that contains the scene of interest. This window may be enlarged to fill the entire screen without any loss of resolution as compared to the first video resolution. Upon completion of the video clip window as determined by the marked end point, the logic flow 700 may return to the regular broadcast of the first video stream at block 740. The embodiments are not limited to these examples.

Figure 8:
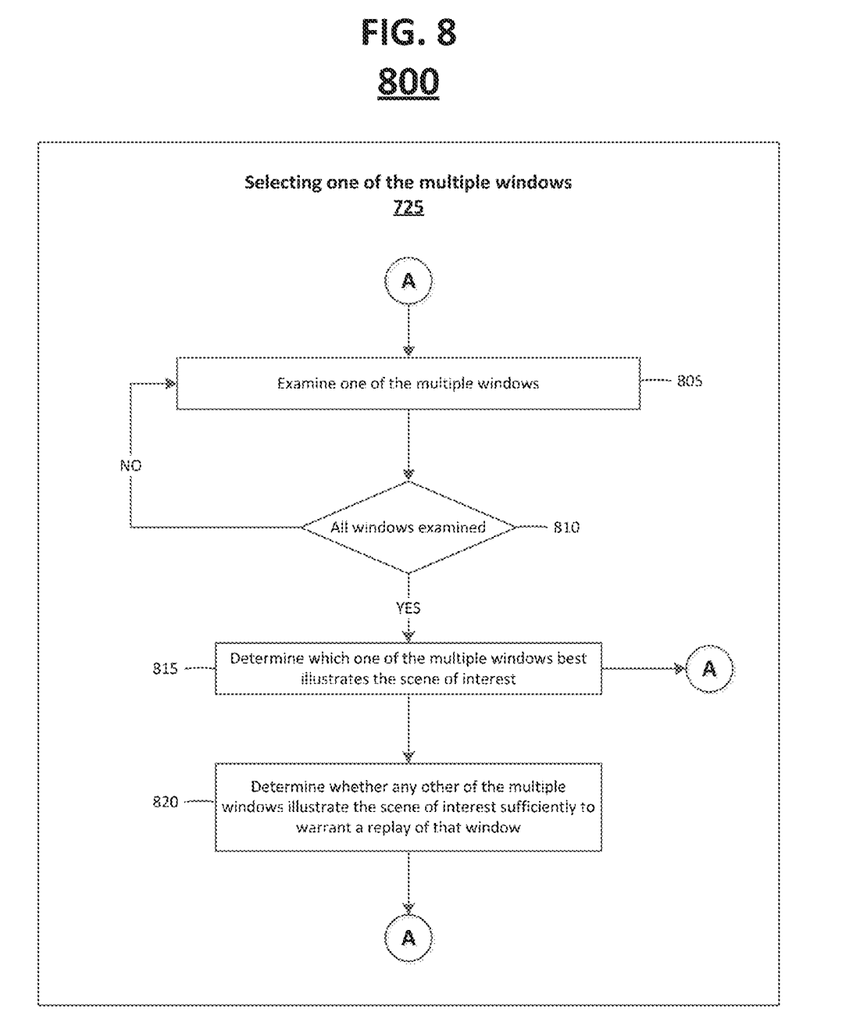
FIG. 8 illustrates one embodiment of a logic flow.

FIG. 8 illustrates one embodiment of a logic flow 800 that further describes the process of block 725 in FIG. 7. The logic flow 800 may be representative of some or all of the operations executed by one or more embodiments described herein.

In the illustrated embodiment shown in FIG. 8, the logic flow 800 may examine one of the multiple windows at block 805. For example, the replay clip selection module 250 may permit an operator to view the first individual window created by the UHD replay clip editing module 240. The logic flow 800 may determine if all the windows have been examined at block 810. If not, the replay clip selection module 250 may permit an operator to view the next individual window created by the UHD replay clip editing module 240. The process may be repeated until all of the individual windows created by the UHD replay clip editing module 240 have been examined by the operator. The embodiments are not limited to these examples.

The logic flow 800 may determine which one of the multiple windows best illustrates the scene of interest at block 815. For example, the operator may determine that one of the multiple windows captures the scene of interest better than any of the other windows. This window may then be selected to be replayed first and control of the process reverts back to block 730 of FIG. 7. The embodiments are not limited to these examples.

Even though the window that best illustrates the scene of interest may have been identified, other windows may still present portions of the scene of interest that are not present in the previously selected window. Thus, the logic flow 800 may determine whether any other of the multiple windows illustrate the scene of interest sufficiently to warrant a replay of that window at block 820. For example, the operator may determine that another of the multiple windows captures at least a portion of the scene of interest. This window may then be selected to be played back and control of the process reverts back to block 730 of FIG. 7. This process may be repeated for each of the multiple windows. The embodiments are not limited to these examples.

Thus FIGS. 7-8 may describe a computer-implemented method that may enhance the video replay capabilities of an event being broadcast. A computer system 118 may play, in a first video resolution, a first video stream of an event. The computer system 118 may receive, in a second video resolution, a second video stream of the event in which the second video resolution is greater than the first video resolution. The computer system 118 may determine a time period within the second video stream that contains a scene of interest associated with the event. The computer system 118 may form multiple windows, each of the multiple windows representative of a portion of the field of view of the second video stream during the time period, each of the multiple windows in the first video resolution. The computer system 118 may select one of the multiple windows and interrupt the playing of the first video stream of the event to replay, during the interruption, the selected window. The replayed window fills the full screen in the first video resolution.

The computer system 118 may determine which one of the multiple windows best illustrates the scene of interest. The computer system 118 may also cause the selected window to be replayed in slow motion.

In another possible embodiment, the second video stream may have a resolution of 16 megapixels per frame of video. Such an ultra high definition resolution is eight (8) times greater than the 2K HD of the first video stream that is being broadcast. Thus, the number of windows that may be created from a frame of a second video stream of 16 megapixels without falling below the HD resolution of 2K is eight (8). Consequently, the broadcaster may provide an eight times enlarged image of a portion of the video frame without any loss of picture quality. FIGS. 9-12 provide such an example.

Figure 9:
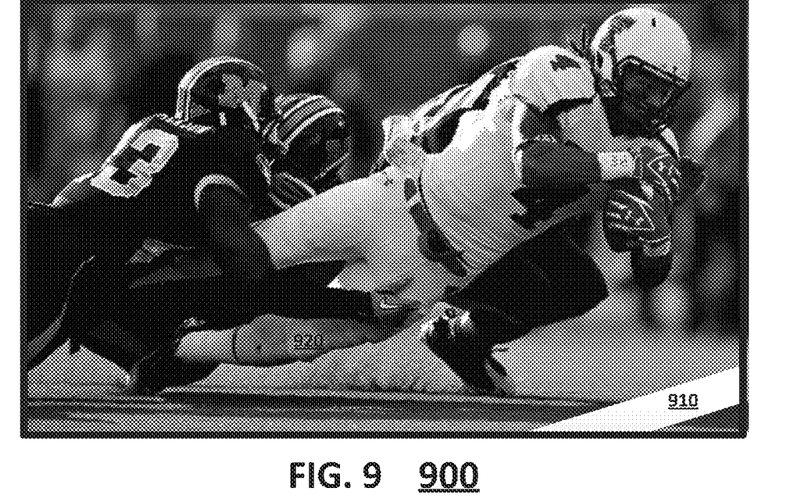
FIG. 9 illustrates an example of a frame of video from a football game in a second video resolution.

FIG. 9 illustrates an example of a frame of video 900 from a baseball game in a second video resolution. This example illustrates a play in a football game. As shown, a runner is being tackled as he approaches the goal line 910. In one part of the video frame 900, the runner's knee 920 can be seen. In another part of the video frame 900, the goal line 910 and leading edge of a football can be seen. All of this occurs during real-time meaning the second video stream changes frames at a rate of 30 frames per second (fps), for example. At such speeds, it may be difficult to see whether the runner's knee 920 actually makes contact with the ground prior to the leading edge of the football crossing the plane of the goal line 910. The UHD replay clip editing module 240 may be used to process the second video stream to help determine the outcome of this play.

Figure 10:
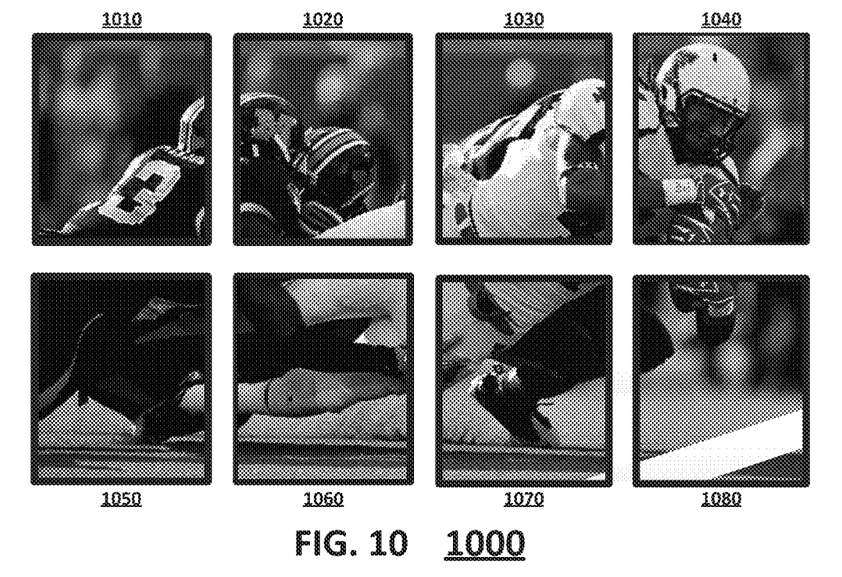
FIG. 10 illustrates an example the frame of video from a football game in a second video resolution from FIG. 9 divided into multiple windows.

FIG. 10 illustrates an example the frame of video 1000 from a football game in a second video resolution from FIG. 9 divided into multiple windows 1010-1080. The UHD replay clip editing module 240 may divide the second video stream into the aforementioned four windows 1010-1080. Each of these windows may have a resolution that is ⅛ the overall resolution. However, ⅛ the overall resolution of the second video stream of 16 megapixels per frame of video may still be equivalent to the resolution of the first video stream of 2 k HD (2 megapixels per frame of video). Thus, each window 1010-1080 possesses a resolution equal to the resolution that is being viewed by the end viewer. The replay clip selection module 250 may assist in selecting one of the multiple windows 1010-1080 to play back.

Figure 11:
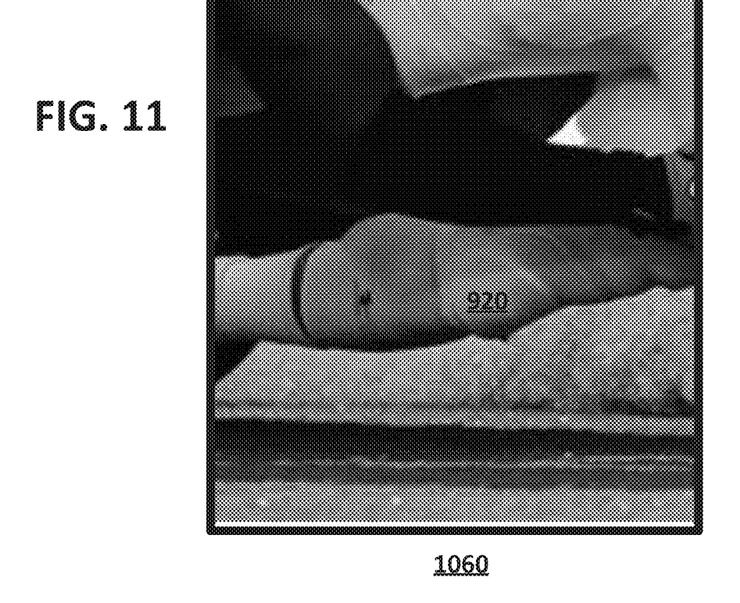
FIG. 11 illustrates an example of a frame of video from a football game of one of the multiple windows of FIG. 10.

FIG. 11 illustrates an example of a frame of video from a football game of one of the multiple windows of FIG. 10. In this example, window 1060 has been selected by the replay clip selection module 250. Window 1060 includes a scene of interest. Specifically, the scene of interest may be characterized as whether the runner's knee is in contact with the ground. The window 1060 has been enlarged by a zoom factor of eight (8) to fill the entire screen at the resolution of the first video stream. Thus, the viewer may see a zoomed portion of the play with no loss of video resolution.

Figure 12:
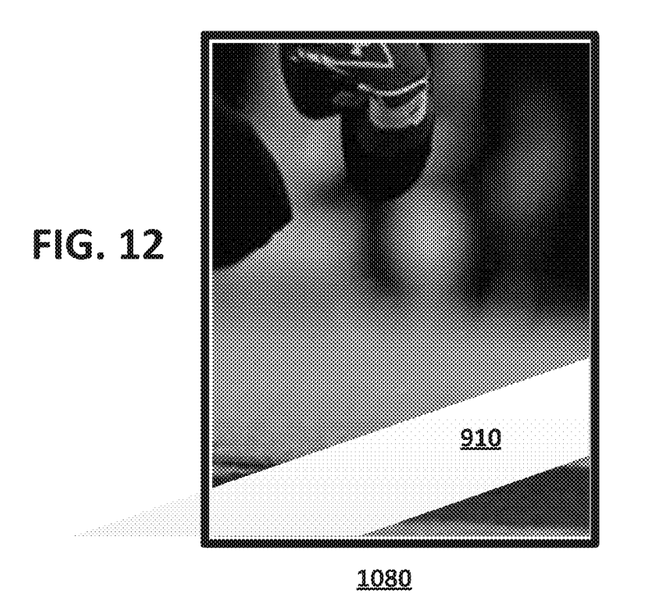
FIG. 12 illustrates another example of a frame of video from a football game of another of the multiple windows from FIG. 10.

FIG. 12 illustrates another example of a frame of video from a football game of another of the multiple windows from FIG. 10. In this example, window 1080 has been selected by the replay clip selection module 250. Window 1080 also includes a scene of interest. Specifically, the scene of interest may be characterized as determining when the leading edge of the football crosses the goal line 910. The window 1080 has similarly been enlarged by a zoom factor of eight (8) to fill the entire screen at the resolution of the first video stream. Thus, the viewer will see a zoomed portion of the play with no loss of video resolution.

It should be noted that FIGS. 9-12 are illustrative of the embodiments described herein and may not actually depict the resolutions described.

Figure 13:
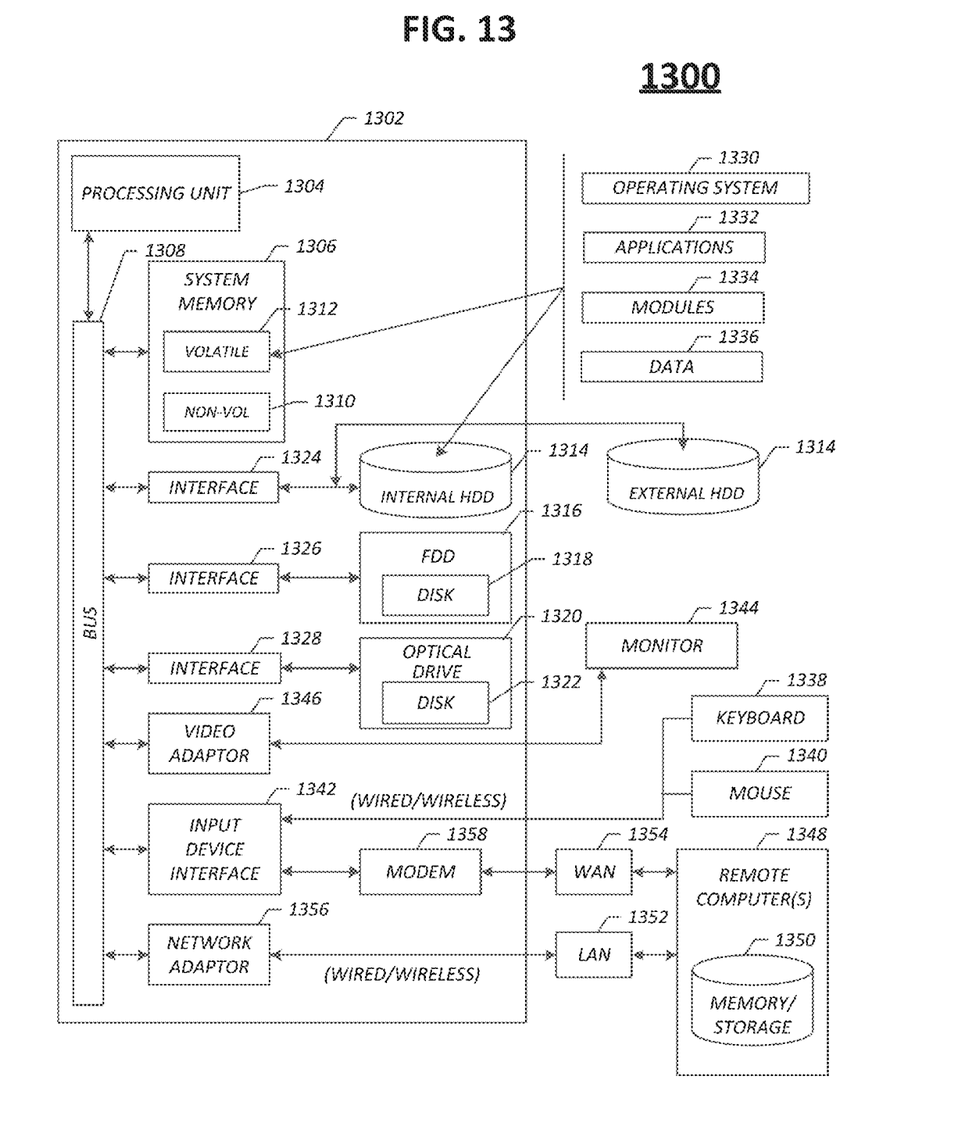
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIGS. 1 and 2, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   logic, at least a portion of which is implemented in hardware;
   a video interface module operative by the logic to receive a video stream from a plurality of ultra high definition (UHD) camera units in a first video resolution;
   an editing module operative by the processor component to create multiple video clips of the video stream in a second video resolution, the second video resolution lower than the first video resolution, each of the multiple video clips representative of a portion of the field of view of the video stream; and
   a broadcast feed module operative by the processor component to broadcast at least one of the multiple video clips in the second video resolution.

2. The apparatus of claim 1, comprising a user interface operative by the processor component to receive and process user input for the editing module, and the broadcast feed module.

3. The apparatus of claim 2, comprising a display operative by the processor component to display data to assist an operator using the user interface, the editing module, and the broadcast feed module.

4. The apparatus of claim 1, comprising a memory operative by the processor component to store the video stream and to store the multiple video clips.

5. The apparatus of claim 1, the first video resolution being at least four (4) times the second video resolution.

6. The apparatus of claim 1, the first video resolution being an ultra-high definition (UHD) resolution and the second video resolution being a high definition (HD) resolution.

7. The apparatus of claim 1, the number of multiple video clips being at least four (4).

8. The apparatus of claim 1, comprising a broadcast satellite uplink component to receive and broadcast the at least one of the multiple video clips.

9. A computer-implemented method, comprising:
   receiving, from a plurality of ultra high definition (UHD) camera units, in a first video resolution, a video stream;
   forming multiple video clips of the video stream in a second video resolution, the second video resolution lower than the first video resolution, each of the multiple video clips representative of a portion of the field of view of the video stream;
   selecting one of the multiple video clips;
   broadcasting the selected one of the multiple video clips in the second video resolution.

10. The computer-implemented method of claim 9, further comprising:
    displaying data to assist an operator in selecting one of the multiple video clips; and
    receiving user input from the operator comprising the selection of the one of the multiple video clips.

11. The computer-implemented method of claim 9, the first video resolution being at least four (4) times the second video resolution.

12. The computer-implemented method of claim 9, the first video resolution being an ultra-high definition (UHD) resolution and the second video resolution being a high definition (HD) resolution.

13. The computer-implemented method of claim 9, the number of multiple video clips being at least four (4).

14. The computer-implemented method of claim 9, wherein broadcasting the selected one of the multiple video clips in the second video resolution comprises forwarding the selected one of the multiple video clips to a broadcast satellite uplink component.

15. At least one non-transitory computer-readable storage medium comprising instructions that, when executed, cause a system to:
    receive, from a plurality of camera units, in a first video resolution, a video stream of an event;
    form multiple video clips of the video stream in a second video resolution, the second video resolution lower than the first video resolution, each of the multiple video clips representative of a portion of the field of view of the video stream;
    select one of the multiple video clips;
    broadcast the selected one of the multiple video clips in the second video resolution.

16. The computer-readable storage medium of claim 15, the first video resolution being at least four (4) times the second video resolution.

17. The computer-readable storage medium of claim 15, the first video resolution being an ultra-high definition (UHD) resolution and the second video resolution being a high definition (HD) resolution.

18. The computer-readable storage medium of claim 15, the number of multiple video clips being at least four (4).

19. The computer-readable storage medium of claim 15, wherein the instructions that, when executed, cause the system to broadcast the selected one of the multiple video clips in the second video resolution comprise instructions that, when executed, cause the system to forward the selected one of the multiple video clips to a broadcast satellite uplink component.

* * * * *